United States Patent
Jung et al.

(10) Patent No.: US 10,844,878 B2
(45) Date of Patent: Nov. 24, 2020

(54) HYDRAULIC COMPONENT, COMBINATION MADE FROM HYDRAULIC COMPONENTS, AND HYDRAULIC SYSTEM COMPRISING AT LEAST ONE SUCH HYDRAULIC COMPONENT OR COMBINATION

(71) Applicant: BorgWarner Inc., Auburn Hills, MI (US)

(72) Inventors: Michael Jung, Bruehl (DE); Martin Hirsch, Ludwigshafen (DE); Dominik Mueller, Birkenau (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/075,773

(22) PCT Filed: Feb. 3, 2017

(86) PCT No.: PCT/US2017/016381
§ 371 (c)(1),
(2) Date: Aug. 6, 2018

(87) PCT Pub. No.: WO2017/136644
PCT Pub. Date: Aug. 10, 2017

(65) Prior Publication Data
US 2019/0048896 A1    Feb. 14, 2019

(30) Foreign Application Priority Data
Feb. 6, 2016    (DE) .................... 10 2016 001 357

(51) Int. Cl.
*F15B 13/02*    (2006.01)
*F15B 1/033*    (2006.01)
(Continued)

(52) U.S. Cl.
CPC ............ *F15B 1/033* (2013.01); *F15B 13/024* (2013.01); *F15B 13/043* (2013.01);
(Continued)

(58) Field of Classification Search
CPC ...................... F15B 13/024; F15B 13/027; F15B 2211/611; F15B 1/027
See application file for complete search history.

(56) References Cited

U.S. PATENT DOCUMENTS 3,570,519 A * 3/1971 Bianchetta .............. F15B 1/027
137/101
4,958,495 A    9/1990 Yamaguchi
(Continued)

FOREIGN PATENT DOCUMENTS

WO    0000378 A1    1/2000

OTHER PUBLICATIONS

International Search Report for Application No. PCT/US2017/016381 dated May 12, 2017, 4 pages.

*Primary Examiner* — F Daniel Lopez
(74) *Attorney, Agent, or Firm* — Howard & Howard Attorneys PLLC

(57) ABSTRACT

A hydraulic component includes a piston and a cylinder with a piston receiving space in which the piston is displaceably arranged while defining a chamber, via which a pressure may be applied to a first end face of the piston, from a control chamber, via which pressure may be applied to a second end face of the piston which faces away from the first end face. A first hydraulic line and a second hydraulic line open into the chamber and a control line, which branches off from the first hydraulic line, opens into the control chamber. Due to the respective pressure ratio between the pressure in the chamber and the control chamber, the piston is displaceable from a closed position, in which the first and second
(Continued)

hydraulic lines are fluidly decoupled, into an open position, in which the first and second hydraulic lines are fluidly connected, and vice versa.

14 Claims, 2 Drawing Sheets

(51) Int. Cl.
*F15B 13/043* (2006.01)
*F01P 7/14* (2006.01)
*F16D 48/02* (2006.01)

(52) U.S. Cl.
CPC .... *F15B 13/0431* (2013.01); *F01P 2007/146* (2013.01); *F15B 2211/50518* (2013.01); *F15B 2211/50536* (2013.01); *F15B 2211/611* (2013.01); *F15B 2211/62* (2013.01); *F16D 48/02* (2013.01); *F16D 2048/029* (2013.01)

(56) References Cited

U.S. PATENT DOCUMENTS

| | | | |
|---|---|---|---|
| 5,020,324 A * | 6/1991 | MacDonald | F04B 49/007 417/252 |
| 5,188,433 A | 2/1993 | Reinartz et al. | |
| 8,631,820 B2 * | 1/2014 | Kobayashi | F15B 13/027 137/512.2 |
| 2009/0313985 A1 | 12/2009 | Heren et al. | |
| 2015/0020516 A1 * | 1/2015 | Matsushima | F16K 17/06 60/459 |
| 2015/0135699 A1 | 5/2015 | Stephan et al. | |
| 2017/0130744 A1 * | 5/2017 | Zhang | F15B 11/024 |

\* cited by examiner

HYDRAULIC COMPONENT, COMBINATION MADE FROM HYDRAULIC COMPONENTS, AND HYDRAULIC SYSTEM COMPRISING AT LEAST ONE SUCH HYDRAULIC COMPONENT OR COMBINATION

The present application is the National Stage of International Patent Application No. PCT/US2017/016381, filed on Feb. 3, 2017, which claims priority to and all the benefits of German Patent Application No. 102016001357.5, filed on Feb. 6, 2016, which are hereby expressly incorporated herein by reference in their entirety.

The present invention relates to a hydraulic component for a hydraulic system comprising a piston and a cylinder which is displaceably arranged in a piston receiving space. In addition, the present invention relates to a combination made from at least two hydraulic components of this type and a hydraulic system which has at least one such hydraulic component or one such combination made from hydraulic components.

Different hydraulic components comprising a piston and a cylinder are known from the prior art, wherein a piston receiving space, in which the piston is displaceably arranged for the purpose of controlling the hydraulic fluid, is provided in the cylinder.

The underlying object of the present invention is to create a hydraulic component which functions to control large hydraulic fluid volume flows and thereby has a simple structure and guarantees a largely leak-free operation. In addition, the underlying object of the present invention is to create a combination made from at least two hydraulic components of this type with the previously mentioned advantages. Furthermore, the underlying object of the present invention is to create a hydraulic system which has at least one advantageous hydraulic component of this type or one advantageous combination of this type made from at least two hydraulic components.

This problem is solved by the features listed in patent Claims 1, 7, or 8. Advantageous embodiments of the invention are the subject matter of the subclaims.

The hydraulic component according to the invention has a piston and a cylinder. A piston receiving space is provided in the cylinder. The piston is displaceably arranged in the piston receiving space. The piston is thereby arranged in the piston receiving space in such a way that the piston defines a chamber from a control chamber. The piston thereby has a first end face, which faces toward the chamber and on which pressure may be applied. In addition, the piston has a second end face, which faces away from the first end face and on which pressure may be applied via the control chamber. The term "end face" hereby makes clear that the two end faces point in the opposing movement or displacement directions of the piston in order to face toward the chamber or the control chamber. In addition, the hydraulic component has a first hydraulic line, a second hydraulic line, and a control line. Whereas the first and second hydraulic lines open into the chamber, the control line, which branches off from the first hydraulic line, opens into the control chamber. Due to a predetermined pressure ratio between the pressure in the chamber and in the control chamber, the piston may thus be displaced from a closed position, in which the first and second hydraulic lines are fluidly decoupled, into an open position, in which the first and second hydraulic lines are fluidly connected, and vice versa. The piston may thereby be preferably pretensioned into the closed position, which may be effected particularly preferably by a corresponding spring element, for example, a coil spring.

Even if a controller or components for controlling are generally discussed herein, it should be noted that this controller or components of the controller may equally be used in the context of a regulation or regulating device, as this is additionally preferred.

Basically, no valve or similar has to be provided in the control line for controlling the pressure in the control chamber, for example, when the hydraulic component is designed as a simple pressure limiter, wherein, in this case, the piston is preferably pretensioned in the closed position, as this has already been previously indicated. Alternatively to this, in one preferred embodiment of the hydraulic component according to the invention, a controllable valve for controlling the pressure in the control chamber is provided in the control line. The controllable valve is preferably an electrically controllable valve. The controllable valve may thereby be designed as an on/off valve, which may merely adopt a closed position and a predetermined open position. Alternatively, the controllable valve may be designed as a pressure control valve, particularly preferably as a proportional valve, in order to be able to accordingly achieve or set different high pressures within the control chamber. By this means, the hydraulic fluid volume flow through the chamber between the first and second hydraulic line may be specified or set in a more targeted way or more flexibly.

In one particularly preferred embodiment of the hydraulic component according to the invention, the piston is guided directly supported on a wall of the cylinder displaceably in the piston receiving space. The guiding is carried out here, in particular, without an intermediate layer of a piston guide sleeve inserted into the piston receiving space. In this way, the manufacturing expense of the hydraulic component is significantly reduced, and a particularly simple hydraulic component is created which despite this may function largely leak free.

In one particularly preferred embodiment of the hydraulic component according to the invention, the piston is manufactured at least partially or completely from a plastic material or a light-weight metal, optionally aluminum. This would again significantly reduce the manufacturing expense, in particular, when the piston is manufactured partially or completely from a plastic material. In a piston manufactured at least partially or completely from a plastic material, it is advantageous to design the piston as an injection molded part to further simplify the manufacturing of the same.

Alternatively or supplementally to the preceding embodiment, the piston in another advantageous embodiment of the hydraulic component according to present invention is manufactured from a material which deviates from the material of the cylinder. It is hereby particularly preferred when the cylinder is manufactured from a harder material than the piston in order to achieve a suitable hard-soft friction pairing. It is also preferred in this embodiment if at least the components directly supported on the wall of the cylinder are manufactured from a material deviating from the material of the cylinder. Thus, for example, the piston might have a metallic core, which has a sheath made from plastic material in order to hereby be directly supported on the wall of the cylinder. The cylinder itself is particularly preferably made from steel or a light-weight metal, optionally, aluminum.

The preceding embodiments regarding the material of the cylinder and/or the nature thereof in relation to the material of the piston apply in a corresponding way in another advantageous embodiment of the hydraulic component according to the invention to a surface-treated layer or coating of the cylinder forming the wall of the cylinder.

To effect a targeted and leakproof fluidic decoupling between the first and second hydraulic lines in the closed position of the piston, the piston has, in another preferred embodiment of the hydraulic component according to the invention, a protruding stop in the region of the first end face facing the chamber, which protruding stop is supported or is supportable on a piston seat in the closed position of the piston. The piston seat is hereby preferably a ring-shaped piston seat.

In another preferred embodiment of the hydraulic component according to the invention, the protruding stop in the region of the first end face of the piston is formed as a cone, a truncated cone, or a cylinder. In the case of a cylindrical protruding stop, it is additionally preferred if the cylindrical protruding stop has a cone-shaped or truncated cone end section. In addition, it is preferred in this embodiment, if the piston seat is designed as a truncated cone for a flat support of the cone-shaped or truncated cone protruding stop or end section. Generally, the truncated cone piston seat mentioned here may, however, also be combined in an advantageous way with a cylindrical protruding stop or cylindrical end section of the protruding stop to effect a linear support, or optionally an annular support.

In one particularly advantageous embodiment of the hydraulic component according to the invention, pressure may be applied to a first surface section of the first end face of the piston in the closed position thereof only via the first hydraulic line, whereas pressure may be applied to a second surface section of the first end face of the piston in the closed position thereof only via the second hydraulic line. It is hereby preferred if the first or second surface section annularly surrounds the second or first surface section.

In the combination according to the invention made from at least two hydraulic components of the type according to the invention, the cylinder of one of the hydraulic components is an intrinsic component of a cylinder block, in which one cylinder of at least another of the hydraulic components is designed as intrinsic. By this means, a particularly compact and simple structure is achieved for the combination made from two or more hydraulic components, which additionally further reduces the manufacturing expense.

The hydraulic system according to the invention, for example for a clutch device and/or a transmission, has a hydraulic pump for generating a pump output pressure and at least one hydraulic component or combination made from hydraulic components of the previously described type.

In one preferred embodiment of the hydraulic system according to the invention, one of the hydraulic components is designed as a pump output pressure limiter such that this hydraulic component functions to limit the pump output pressure, for example through timed or phased pressure release. The hydraulic component designed as a pump output pressure limiter preferably has the previously mentioned pretension into the closed position, optionally by means of the claimed spring element.

In another advantageous embodiment of the hydraulic system according to the invention, the pump output pressure may be applied to the second hydraulic line of the hydraulic component designed as a pump output pressure limiter, whereas the first hydraulic line of the pump output pressure limiter leads to an oil sump. The first hydraulic line thereby preferably leads directly or indirectly into an oil sump assigned to the hydraulic pump.

In another advantageous embodiment of the hydraulic system according to the invention, one of the hydraulic components is designed as a pump output pressure controller, i.e. the hydraulic component functions to control the pump output pressure before this pressure is provided to the larger system as a system pressure. The pump output pressure may thereby be applied to the first hydraulic line of the hydraulic component designed as a pump output pressure controller. It is hereby preferred if the pump output pressure, limitable or limited by the already previously described pump output pressure limiter or another pressure limiter, is applied to the first hydraulic line of the pump output pressure controller. In addition, it is preferred in this embodiment if the hydraulic fluid is supplied or is suppliable via the second hydraulic line of the pump output pressure controller as coolant for cooling a device assigned to the hydraulic system, for example, a clutch device.

In another advantageous embodiment of the hydraulic system according to the invention, one of the hydraulic components is designed as a coolant controller for controlling the coolant of the coolant supplied or suppliable to the device via the second hydraulic line of the pump output pressure controller. It is hereby preferred if the second hydraulic line of the pump output pressure controller is fluidly connected to the first hydraulic line of the coolant controller, whereas the coolant is supplied or is suppliable to the device via the second hydraulic line of the coolant controller. In this embodiment, it is additionally preferred if another of the hydraulic components is designed as a coolant pressure limiter to limit the coolant pressure of the coolant supplied or suppliable to the device. In this case, for example, the second hydraulic line of the coolant pressure limiter might be fluidly connected to the first hydraulic line of the coolant controller, whereas the first hydraulic line of the coolant pressure limiter leads into an oil sump, optionally directly or indirectly into an oil sump assigned to the hydraulic pump. The hydraulic component designed as a coolant pressure limiter preferably has the previously mentioned pretension into the closed position, optionally by means of the claimed spring element.

In another particularly preferred embodiment of the hydraulic system according to the invention, a hydraulic accumulator chamber is chargeable by the hydraulic pump via a check valve, wherein one of the hydraulic components is designed as the pump output pressure release assigned to the hydraulic pump. It is hereby preferred if the pump output pressure may be applied to the first hydraulic line of the pump output pressure release, whereas the second hydraulic line of the pump output pressure release leads to an oil sump, optionally directly or indirectly into an oil sump assigned to the hydraulic pump. It is also preferred in this embodiment if the first hydraulic line of the pump output pressure release opens into a line between the hydraulic pump and the check valve. Alternatively, the second hydraulic line of the pump output pressure release may also function to supply the low pressure range of the hydraulic system; the low pressure range functions for lubricating or cooling the device. Regardless of the respectively selected embodiment variant, this embodiment of the hydraulic system has the advantage that the hydraulic pump may be constantly driven, consequently it does not have to be decoupled, even when the hydraulic accumulator chamber is already charged and the check valve is closed.

In another particularly preferred embodiment of the hydraulic system according to the invention, a hydraulic accumulator chamber is provided which is chargeable by the hydraulic pump via a check valve, wherein one of the hydraulic components is designed as a hydraulic accumulator chamber discharge assigned to the hydraulic accumulator chamber for discharging the hydraulic accumulator chamber. Thanks to the hydraulic accumulator chamber discharge, a safe discharge of the hydraulic accumulator chamber is possible or guaranteed during switching off, an emergency stop, or a malfunction of the hydraulic system. It is preferred in this embodiment if the pressure from the hydraulic accumulator chamber may be applied to the first hydraulic line of the hydraulic accumulator chamber discharge, whereas the second hydraulic line of the hydraulic accumulator chamber discharge leads to an oil sump, optionally directly or indirectly into an oil sump assigned to the hydraulic pump. It has also proven advantageous in this context, if the first hydraulic line of the hydraulic accumulator chamber discharge opens into a line between the hydraulic accumulator chamber and the check valve.

To further simplify the structure and manufacturing of the hydraulic system with the hydraulic accumulator chamber and check valve, the check valve is designed as a hydraulic component of the type according to the invention in another preferred embodiment of the hydraulic system according to the invention. It is hereby preferred if the second hydraulic line of the check valve is assigned to the hydraulic pump, whereas the first hydraulic line of the check valve is assigned to the hydraulic accumulator chamber. The hydraulic component designed as a check valve preferably has the previously mentioned pretension into the closed position, optionally by means of the claimed spring element.

In another advantageous embodiment of the hydraulic system according to the invention, a drive unit is provided, wherein the hydraulic pump is constantly driven or is constantly drivable by the drive unit. Consequently, a decoupling of the drive unit from the hydraulic pump is not necessary, which simplifies the structure of the hydraulic system. In this case, for example, the previously mentioned hydraulic component in the form of the pump output pressure release may lead to a discharge of the system. The drive unit may, for example, be an internal combustion engine of a motor vehicle. In this embodiment, it is additionally preferred if the hydraulic pump is driven or drivable by the drive unit even after reaching the target pressure in the hydraulic accumulator chamber and/or after blocking the check valve.

The clutch device according to the invention has a hydraulic system of the type according to the invention, wherein the hydraulic system functions for hydraulic actuating and/or cooling or lubricating of the clutch device. The clutch device is preferably a wet-running clutch device which may be supplied with coolant and/or lubricant via the hydraulic system. It is additionally preferred if the clutch device is designed as a disk clutch device. The term clutch device also refers to brake devices, wet-running brake devices and/or disk brake devices.

The invention will subsequently be explained in more detail by means of exemplary embodiments with reference to the accompanying drawings.

Figure 1:
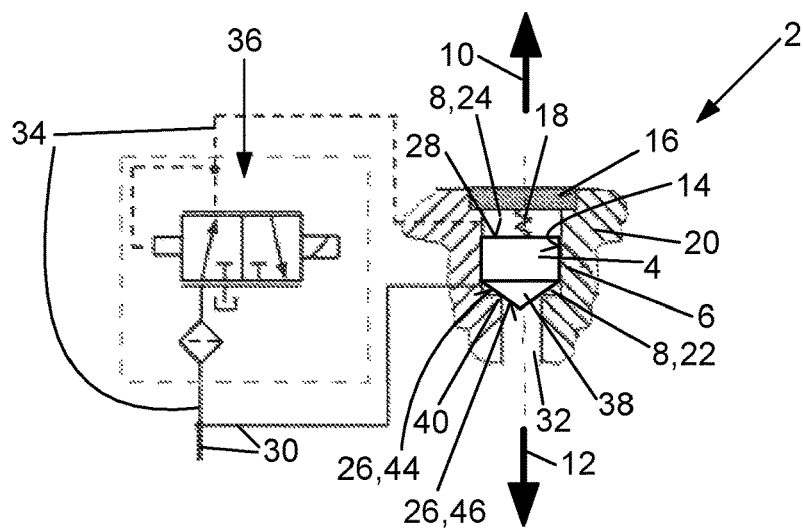
FIG. 1 shows a schematic representation of one embodiment of the hydraulic component according to the invention in partial cutaway representation.

FIG. 1 shows one embodiment of the hydraulic component 2 according to the invention. Hydraulic component 2 has a piston 4 and a cylinder 6 comprising a piston receiving space 8 in which piston 4 is displaceably arranged. Piston 4 is thereby displaceable within piston receiving space 8 in opposing displacement directions 10, 12. Cylinder 6 has a wall 14 facing piston receiving space 8 transverse to displacement directions 10, 12, wherein piston 4 is displaceably guided supported directly on wall 14 of cylinder 6 in piston receiving space 8. Thus, piston 4 is supported transversely to displacement directions 10, 12 on wall 14 of cylinder 6, in particular without an intermediate layer of a piston guide sleeve inserted into piston receiving space 8.

Piston receiving space 8 is defined in displacement direction 10 by a cover part 16 which is preferably detachably fixed on cylinder 6. In addition, piston 4 is pretensioned by means of a spring element 18 in the closed position, to be described later, wherein spring element 18 functions or is arranged between cover part 16 on the one side and the end face of piston 4 facing in displacement direction 10 on the other side in the embodiment shown. Cylinder 6 of hydraulic component 2 is designed as an intrinsic component of a cylinder block 20. In the combination according to the invention made from two or more hydraulic components 2, the cylinder of at least one additional hydraulic component 2 is likewise designed as intrinsic to mentioned cylinder block 20, even though the representation of such a combination of two or more hydraulic components 2 has been foregone in FIG. 1.

Piston 4 is arranged in piston receiving space 8 while defining a chamber 22 from a control chamber 24, wherein piston 4 is arranged between chamber 22 on the one side and control chamber 24 on the other side in displacement directions 10, 12. Piston 4 thereby has a first end face 26, which faces chamber 22 in displacement direction 12 and via which pressure may be applied to piston 4, and a second end face 28, which faces control chamber 24 in displacement direction 10 and via which pressure may likewise be applied to piston 4. Consequently, the two end faces 26, 28 are provided on the sides of piston 4 facing away from one another in displacement directions 10, 12. A first hydraulic line 30 and a second hydraulic line 32 open into chamber 22, whereas a hydraulic line, which branches off from first hydraulic line 30 in the form of a control line 34, opens into control chamber 24. Based on the respective pressure ratio between the pressure in chamber 22 and the pressure in control chamber 24, piston 4 may be displaced in displacement direction 10 from the closed position, shown in FIG. 1, in which first and second hydraulic lines 30, 32 are fluidly decoupled, into an open position, in which first and second hydraulic lines 30, 32 are fluidly connected, and vice versa.

Figure 2:
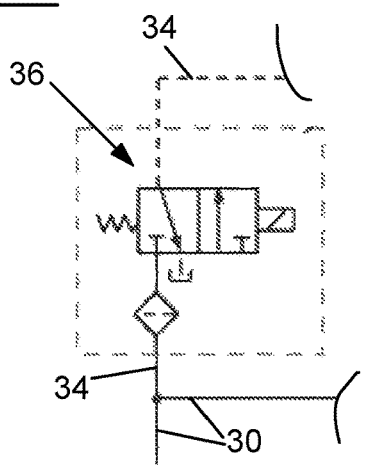
FIG. 2 shows a partial representation of the hydraulic component from FIG. 1 in a first embodiment variant.
Figure 3:
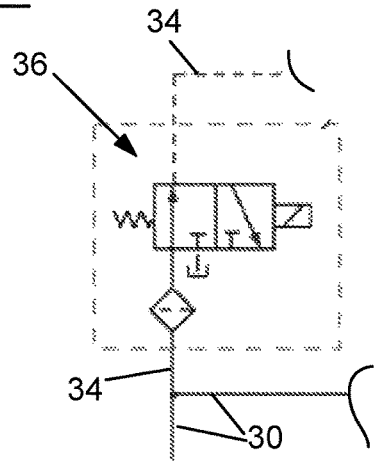
FIG. 3 shows a partial representation of the hydraulic component from FIG. 1 in a second embodiment variant.

Depending on the intended use of hydraulic component 2, control line 34 may be designed as a simple control line without a valve, or, as in the embodiment shown, as control line 34, in which an electrically controllable valve 36 is arranged for controlling the pressure in control chamber 24. In the embodiment variant according to FIG. 1, controllable valve 36 is designed as a pressure control valve or proportional valve in order to adjust different high pressures within control chamber 24 in a targeted way and thus to be able to create a particularly flexibly usable hydraulic component 2. Alternatively, controllable valve 36 might, however, also be designed as an on/off valve, as this is alternatively indicated in FIGS. 2 and 3, wherein FIG. 2 shows an on/off valve pretensioned in the closed position (normally closed), whereas FIG. 3 shows an on/off valve pretensioned in the open position (normally open). In all three of the cases shown, controllable valve 36 is electrically controllable so that it may also be stated that hydraulic component 2 may be electrohydraulically actuated.

Piston 4 is manufactured at least partially or completely from a plastic material or a light-weight metal, optionally, aluminum. Thus, piston 4, manufactured at least partially or completely from a plastic material, may significantly reduce the manufacturing expense, which is then particularly the case when piston 4 is designed as an injection molded part. Piston 4, manufactured at least partially from a plastic material, may, for example, have a core made from metal or the like, whereas this core is completely or at least partially sheathed by a plastic material. In contrast, cylinder 6 or cylinder block 20 is manufactured from a material which deviates from the material of piston 4, preferably made from steel. It is hereby preferred if at least the components of piston 4 directly supported on wall 14 of cylinder 6 are manufactured from a material deviating from the material of cylinder 6, for example, are made from the previously mentioned plastic material.

Figure 4:
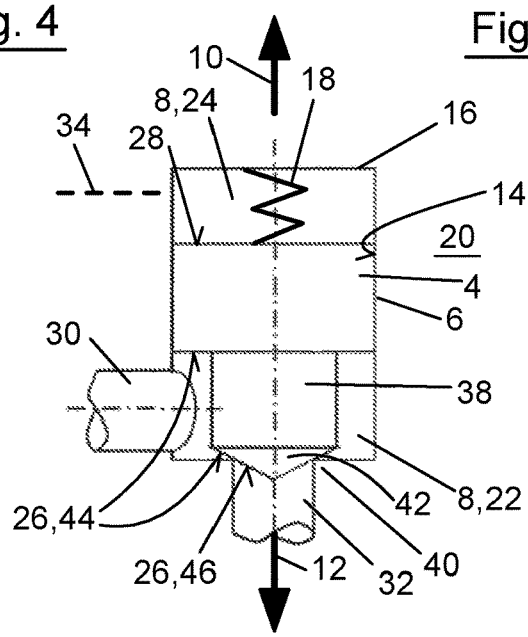
FIG. 4 shows a partial representation of the hydraulic component from FIG. 1 in a third embodiment variant.
Figure 5:
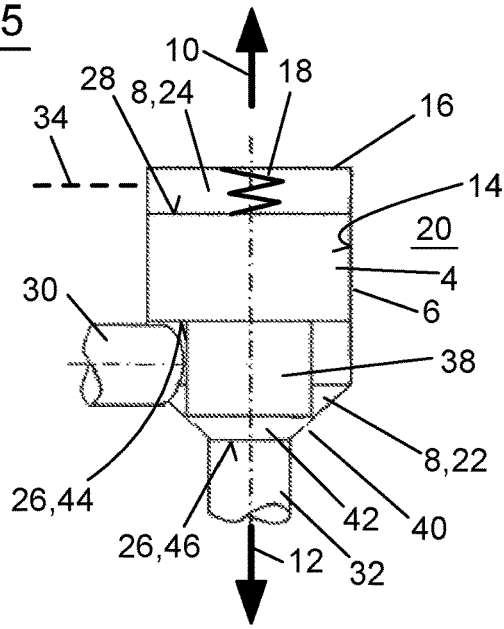
FIG. 5 shows a partial representation of the hydraulic component from FIG. 1 in a fourth embodiment variant.

In the region of first end face 26, piston 4 has a protruding stop 38, which is supported or is supportable in the closed position of piston 4, shown in FIG. 1, on an annular piston seat 40. In the embodiment shown, annular piston seat 40 surrounds, in particular, the discharge opening of second hydraulic line 32. In the embodiment according to FIG. 1, protruding stop 38, which extends across the entirety of first end face 26, is designed as cone shaped; however, this might also be designed as a truncated cone. Potential alternative embodiment variants of protruding stop 38 are shown in FIGS. 4 and 5, wherein protruding stop 38 is designed in each of the listed embodiment variants as a cylinder. The end section 42 of cylindrical protruding stop 38, which faces in displacement direction 12, is designed as cone shaped in the case of the embodiment variant according to FIG. 4, and as a truncated cone in the case of the embodiment variant according to FIG. 5. In the case of the embodiment variants according to FIGS. 1 and 4, annular piston seat 40 is designed in such a way that it is supported in a circular line on protruding stop 38 or on end section 42 of protruding stop 38. Piston seat 40 may, however, also be designed using a flat support of protruding stop 38 or end section 42 designed as cone-shaped or a truncated cone, as this is shown by way of example in FIG. 5. In this case, piston seat 40 might, as is shown as a substitute for FIGS. 1 and 4 and as shown in FIG. 5, likewise be designed as a truncated cone.

As has already been indicated, piston 4 in FIGS. 1, 4, and 5 is located in the closed position, in which first and second hydraulic lines 30, 32 are fluidly decoupled. In the closed position of piston 4, pressure may be applied to a first surface section 44 of first end face 26 only via first hydraulic line 30, whereas pressure may be applied to a second surface section 46 of first end face 26 only via second hydraulic line 32. First or second surface section 44; 46 annularly surrounds second or first surface section 46; 44. In the embodiment shown, first surface section 44 annularly surrounds second surface section 46. A predetermined behavior of hydraulic component 2 may be set via the relationship between the size of first surface section 44 and the size of second surface section 46. It is basically applicable that second end face 28 of piston 4 essentially has the same size as first end face 26 of piston 4 when these are viewed in displacement direction 10, 12. First and second surface sections 44, 46 may, however, be designed to be smaller in sum than the size of second end face 28 when, for example, previously mentioned protruding stop 38 or end section 42, designed as cone-shaped or a truncated cone, is applied in connection with piston seat 40, designed as a truncated cone, as this is shown in FIG. 5. It is also not necessarily mandatory; however, it is preferred if piston 4 has a circular outer contour for support on wall 14 of cylinder 6 transverse to displacement direction 10, 12, which both simplifies the manufacturing and also guarantees a greater leak-tightness.

Subsequently, two hydraulic systems 48, 50, which have at least one hydraulic component 2 of the type previously described with reference to FIGS. 1 through 5, will be described with reference to FIG. 6 or 7. Both hydraulic systems 48, 50 initially have the similarity that these have a hydraulic pump 52 for generating a pump output pressure $P_A$, wherein hydraulic pump 52 removes the hydraulic fluid from an oil sump 56 via a filter 54; the oil sump might also be designated as a hydraulic fluid sump. Both hydraulic systems 48, 50 provide the, optionally, modified pump output pressure $P_A$ via a system line 58 as a system pressure for a device assigned to hydraulic system 48, 50, which device may be, for example, a clutch device.

Figure 6:
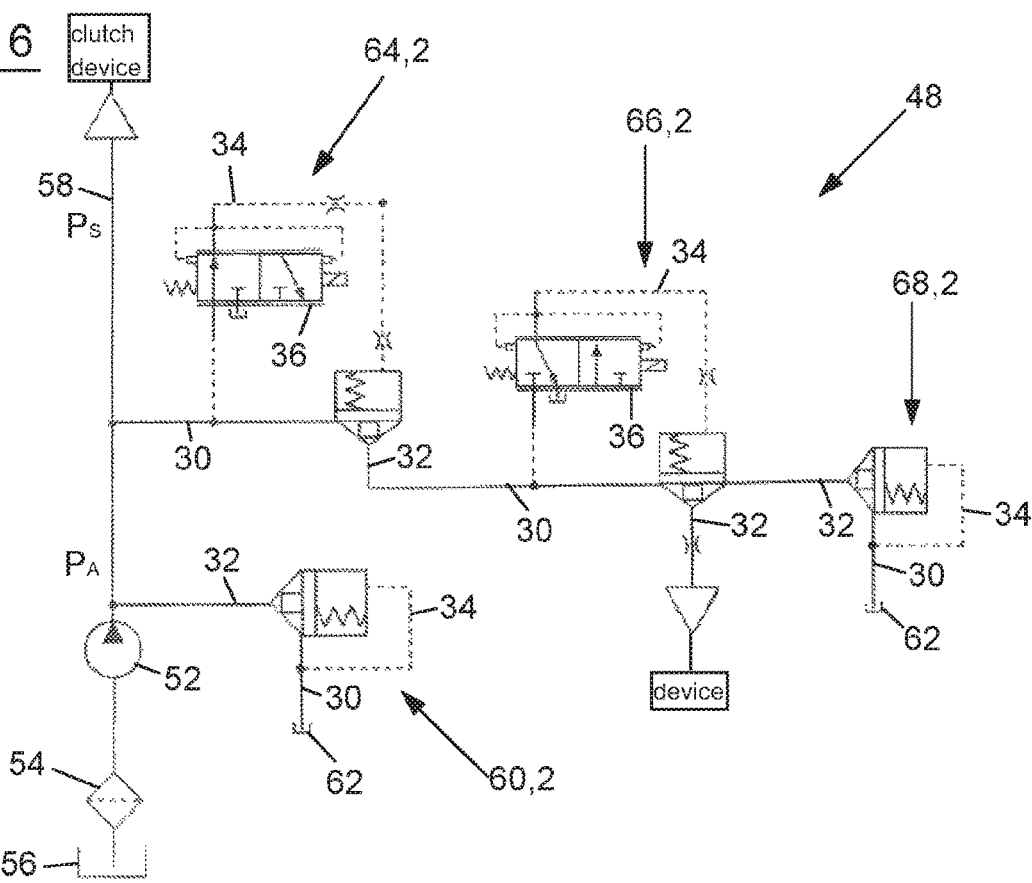
FIG. 6 shows a schematic representation of one embodiment of the hydraulic system according to the invention.

Hydraulic system 48 according to FIG. 6 has one hydraulic component 2, which is designed as a pump output pressure limiter 60. Pump output pressure $P_A$ may be applied to second hydraulic line 32 of pump output pressure limiter 60, in that the second hydraulic line branches off from system line 58 as near as possible downstream of hydraulic pump 52. In contrast, first hydraulic line 30 of pump output pressure limiter 60 leads into oil sump 62. Likewise, first hydraulic line 30 may also lead directly or indirectly into oil sump 56 assigned to hydraulic pump 52, in that, for example, oil sump 62 is fluidly connected to oil sump 56. If pump output pressure $P_A$ should exceed a predetermined pressure value, then this leads to a displacement of piston 4 of pump output pressure limiter 60 against the spring force of spring element 18 from the closed position according to FIG. 6 into the open position, so that hydraulic fluid from second hydraulic line 32 may vent into oil sump 62 via chamber 22 and first hydraulic line 30, such that pump output pressure $P_A$ is limited. If, as a consequence thereof, pump output pressure $P_A$ should be reduced again, then the increased pressure in first hydraulic line 30 affects an increase of the pressure in control chamber 24 of pump output pressure limiter 60 via control line 34, so that piston 4 returns to the closed position, shown in FIG. 6, due to the changed pressure ratio and the pretension force of spring element 18, as soon as pump output pressure $P_A$ reaches the predetermined target value again or drops below the same. As is evident from FIG. 6, a controllable valve 36 is not necessary in hydraulic component 2 designed as pump output pressure limiter 60 in this simple embodiment.

Furthermore, in hydraulic system 48, another hydraulic component 2 is provided, designed as pump output pressure controller 64. Pump output pressure $P_A$, limitable or limited in this case by pump output pressure limiter 60, may be applied to first hydraulic line 30 of pump output pressure controller 64, in that first hydraulic line 30 is branched off from system line 58. Alternatively, pump output pressure $P_A$ might also be limited or limitable by another pressure limiter installed instead of pump output pressure limiter 60, even though pump output pressure limiter 60 as shown has the previously described advantages of hydraulic component 2.

In the embodiment shown, first hydraulic line 30 of pump output pressure controller 64 branches off in the flow direction downstream of the discharge opening of second hydraulic line 32 of pump output pressure limiter 60. If piston 4 of pump output pressure controller 64 is moved into the open position, then the hydraulic fluid may be guided further via first hydraulic line 30 through chamber 22 and second hydraulic line 32 of pump output pressure controller 64, wherein this is carried out in the embodiment shown as coolant for cooling a device, for example, the clutch device, assigned to hydraulic system 48. Consequently, the coolant is directly or indirectly supplied or is suppliable to the listed device via second hydraulic line 32. As is evident from FIG. 6, previously described controllable valve 36, in the form of a pressure control valve or a proportional valve, is provided in control line 34 of pump output pressure controller 64. Consequently, due to corresponding electrical control of controllable valve 36, piston 4 of pump output pressure controller 64 may be moved in a targeted way into the open and closed positions, and also into an intermediate position in order to achieve a targeted pressure increase or decrease in system line 58 via first and second hydraulic lines 30, 32 and chamber 22 positioned therebetween.

In addition, hydraulic system 48 according to FIG. 6 has another hydraulic component 2, designed as coolant controller 66 for controlling the coolant of the coolant supplied or suppliable to the device via second hydraulic line 32 of pump output pressure controller 64. Second hydraulic line 32 of pump output pressure controller 64 is thereby fluidly connected to first hydraulic line 30 of coolant controller 66, whereas, in the case of a piston 4 which is displaced into an open position, the coolant is supplied or is suppliable to the listed device via second hydraulic line 32 of coolant controller 66. The coolant flow in second hydraulic line 32 of coolant controller 66 may hereby be set in a targeted way by controlling the pressure in control chamber 24 of coolant controller 66, wherein the setting of such a control pressure may be easily carried out via controllable valve 36 in control line 34 of coolant controller 66. In this case, controllable valve 36 is also designed as a pressure control valve or a proportional valve. In addition, as is indicated in FIG. 6, yet another hydraulic component 2 may be provided in the form of a coolant pressure limiter 68, the second hydraulic line 32 of which opens, for example, into chamber 22 of coolant controller 66 and functions to limit the coolant pressure of the coolant supplied or suppliable to the device in the embodiment shown. In general, coolant pressure limiter 68 has essentially the structure of pump output pressure limiter 60, so that reference is made to the preceding description which accordingly applies here.

Figure 7:
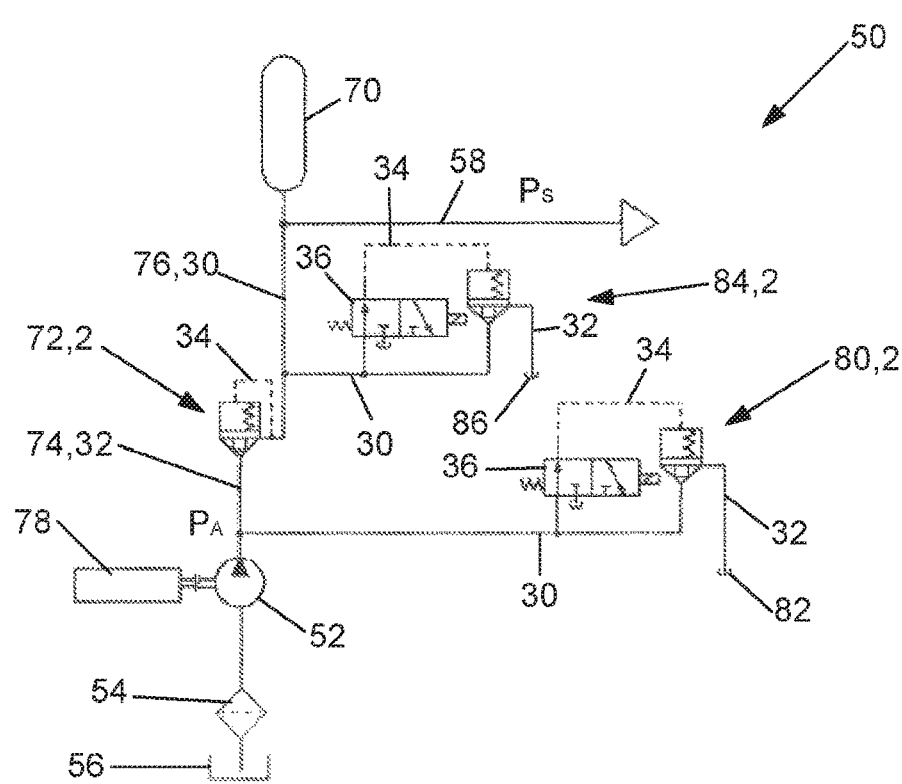
FIG. 7 shows a schematic representation of another embodiment of the hydraulic system according to the invention.

Hydraulic system 50 according to FIG. 7 is additionally provided with a hydraulic accumulator chamber 70 for providing system pressure $P_S$ in the system line 58, wherein hydraulic accumulator chamber 70 is chargeable by hydraulic pump 52 via check valve 72 and may also be designated as a pressure reservoir. For this purpose, a line 74 leads from the output of hydraulic pump 52 to the input of check valve 72, whereas a line 76 leads to the inlet or outlet of hydraulic accumulator chamber 70. As is evident from FIG. 4, check valve 72 is designed as a type of hydraulic component 2, wherein second hydraulic line 32 of check valve 72 corresponds to previously mentioned line 74, whereas first hydraulic line 30 of check valve 72 corresponds to previously mentioned line 76. In other words, second hydraulic line 32 of check valve 72 is assigned to hydraulic pump 52, whereas first hydraulic line 30 of check valve 72 is assigned to hydraulic accumulator chamber 70.

In FIG. 7, a drive unit 78 of hydraulic system 50 is additionally shown, by which means hydraulic pump 52 is constantly driven or is constantly drivable. Thus, drive unit 78 interacts in such a way with hydraulic pump 52 that hydraulic pump 52 is also driven or drivable by drive unit 78 even after reaching the target pressure in hydraulic accumulator chamber 70 and/or after blocking check valve 72. A clutch device for separating drive unit 78 from hydraulic pump 52 is consequently not provided. The structure of check valve 72 corresponds in this case essentially to the structure of pump output pressure limiter 60 according to FIG. 6, or of coolant pressure limiter 68 according to FIG. 6, so that reference is made at this point to the preceding description.

Hydraulic system 50 additionally has another hydraulic component 2 in the form of a pump output pressure release 80, which is assigned to hydraulic pump 52 and functions to release pump output pressure $P_A$. Thus, pump output pressure $P_A$ may be applied at first hydraulic line 30 of pump output pressure release 80, in that the first hydraulic line opens into line 74 between hydraulic pump 52 and check valve 72. In contrast, hydraulic line 32 leads to an oil sump 82. Oil sump 82 might also be oil sump 56 assigned to hydraulic pump 52, wherein second hydraulic line 32 of pump output pressure release 80 might lead directly or indirectly into oil sump 56 assigned to hydraulic pump 52. In the embodiment shown, previously mentioned controllable valve 36 is arranged in control line 34 of pump output pressure release 80, in this case in the form of an on/off valve according to FIG. 3. The functionality of pump output pressure release 80 will be subsequently described in greater detail. Alternatively, second hydraulic line 32 may also function in hydraulic system 50 to supply the low pressure range in hydraulic system 50; the low pressure range functions for lubricating or cooling the device.

Furthermore, hydraulic system 50 according to FIG. 7 has a hydraulic component 2 in the form of a hydraulic accumulator chamber discharge 84 assigned to hydraulic accumulator chamber 70 for discharging hydraulic accumulator chamber 70. The pressure from hydraulic accumulator chamber 70 may be applied to first hydraulic line 30 of hydraulic accumulator chamber discharge 84, wherein first hydraulic line 30 of hydraulic accumulator chamber discharge 84 opens for this purpose into line 76 between hydraulic accumulator chamber 70 and check valve 72, whereas second hydraulic line 32 of hydraulic accumulator chamber discharge 84 leads into an oil sump 86. Second hydraulic line 32 of hydraulic accumulator chamber discharge 84 may thereby lead, optionally, directly or indirectly into oil sump 56 assigned to hydraulic pump 52.

In order to charge hydraulic accumulator chamber 70, hydraulic pump 52 is driven via drive unit 78. Check valve 72 is opened by pump output pressure $P_A$ in order to charge hydraulic accumulator chamber 70 via line 76. If the desired pressure is achieved in hydraulic accumulator chamber 70, and consequently also a corresponding high pressure is achieved in line 76, then check valve 72 thereof is closed via control line 34 in that a corresponding high pressure is generated in control chamber 24 of check valve 72, whereas pump output pressure release 80 opens.

Indeed, the desired pressure is now achieved in hydraulic accumulator chamber 70 and check valve 72 is also closed; yet drive unit 78 continues to drive hydraulic pump 52. To discharge pump output pressure $P_A$, controllable valve 36 of pump output pressure release 80 is closed in order to reduce the pressure in control chamber 24 of pump output pressure release 80 and consequently to open pump output pressure release 80, so that pump output pressure $P_A$ is discharged via first hydraulic line 30, chamber 22, and second hydraulic line 32 of pump output pressure release 80. Decoupling drive unit 78 from hydraulic pump 52 is not necessary.

If hydraulic system 50 is to be switched off, then the pressure release of hydraulic accumulator chamber 70 may be carried out easily and quickly via hydraulic accumulator chamber discharge 84. In this case, controllable valve 36 of hydraulic accumulator chamber discharge 84 is controlled so that this is closed and the pressure falls in control chamber 24 of hydraulic accumulator chamber discharge 84, so that hydraulic accumulator chamber discharge 84 moves into the open position and the pressure in hydraulic accumulator chamber 70 may be discharged via line 76, first hydraulic line 30 of hydraulic accumulator chamber discharge 84, chamber 22 of hydraulic accumulator chamber discharge 84, and second hydraulic line 32 of hydraulic accumulator chamber discharge 84. Controllable valve 36 of hydraulic accumulator chamber discharge 84 may be a normally open valve 36, as this is shown in FIG. 7; alternatively, even if not preferred, controllable valve 36 may also be designed as a normally open valve 36 in order to ensure a hydraulic reservoir discharge even during a lack of the power supply, for example, during switching off of the ignition. Since particularly large hydraulic fluid volume flows may be controlled by pump output pressure release 80 and hydraulic accumulator chamber discharge 84, a particularly fast discharge is possible in both cases.

Finally, reference is made to the fact that the clutch device, which is assigned to hydraulic system 48 or 50, is particularly preferably a wet-running clutch device and/or a disc clutch device, the hydraulic system 48 or 50 thereof functioning for actuating and/or cooling or lubricating the clutch device.

REFERENCES

2 Hydraulic component
4 Piston
6 Cylinder
8 Piston receiving space
10 Displacement direction
12 Displacement direction
14 Wall
16 Cover part
18 Spring element
20 Cylinder block
22 Chamber
24 Control chamber
26 First end face
28 Second end face
30 First hydraulic line
32 Second hydraulic line
34 Control line
36 Controllable valve
38 Protruding stop
40 Piston seat
42 End section
44 First surface section
46 Second surface section
48 Hydraulic system
50 Hydraulic system
52 Hydraulic pump
54 Filter
56 Oil sump
58 System line
60 Pump output pressure limiter
62 Oil sump
64 Pump output pressure controller
66 Coolant controller
68 Coolant pressure limiter
70 Hydraulic accumulator chamber
72 Check valve
74 Line
76 Line
78 Drive unit
80 Pump output pressure release
82 Oil sump
84 Hydraulic accumulator chamber discharge
86 Oil sump

The invention claimed is:

1. A hydraulic system (48, 50) comprising:
  a hydraulic pump (52) for generating a pump output pressure ($P_A$); and
  a hydraulic component (2) comprising,
    a piston (4), and
    a cylinder (6) with a piston receiving space (8) in which the piston (4) is displaceably arranged while defining a chamber (22), via which a pressure is applied to a first end face (26) of the piston (4), from a control chamber (24), via which pressure is applied to a second end face (28) of the piston (4) which faces away from the first end face (26),
    wherein a first hydraulic line (30) and a second hydraulic line (32) open into the chamber (22) and a control line (34), which branches off from the first hydraulic line (30), opens into the control chamber (24), and due to the respective pressure ratio between the pressure in the chamber (22) and the control chamber (24), the piston (4) is displaceable between a closed position, in which the first and second hydraulic lines (30, 32) are fluidly decoupled, and an open position, in which the first and second hydraulic lines (30, 32) are fluidly connected,
    wherein the hydraulic component (2) is designed as a pump output pressure controller (64), wherein the pump output pressure ($P_A$) can be applied to the first hydraulic line (30) of the pump output pressure controller (64); and
  further comprising an additional hydraulic component (2) designed as a coolant controller (66) for controlling the coolant suppliable to a device via the second hydraulic line (32) of the pump output pressure controller (64), wherein the second hydraulic line (32) of the pump output pressure controller (64) is fluidly connected to the first hydraulic line (30) of the coolant controller (66), and wherein the coolant is suppliable to the device via the second hydraulic line (32) of the coolant controller (66).

2. The hydraulic system (48, 50) according to claim 1, wherein a controllable valve (36) is provided in the control line (34) of each of the hydraulic component and the additional hydraulic component for controlling the pressure in the control chamber (24) of each of the hydraulic component and the additional hydraulic component.

3. The hydraulic system (48, 50) according to claim 2, wherein the controllable valve (36) is an on/off valve, a pressure control valve, or a proportional valve.

4. The hydraulic system (48, 50) according to claim 1, wherein the piston (4) of each of the hydraulic component and the additional hydraulic component is displaceably guided supported directly on a wall (14) of the cylinder (6) of each of the hydraulic component and the additional hydraulic component.

5. The hydraulic system (48, 50) according to claim 1, wherein the piston (4) of each of the hydraulic component and the additional hydraulic component is manufactured at least partially from a plastic material or a light-weight metal.

6. The hydraulic system (48, 50) according to claim 5, wherein the piston (4) of each of the hydraulic component and the additional hydraulic component is manufactured from a material deviating from the material of the cylinder (6), and wherein the cylinder (6) of each of the hydraulic component and the additional hydraulic component is manufactured from steel or a light-weight metal.

7. The hydraulic system (48, 50) according to claim 1, wherein the piston (4) of each of the hydraulic component and the additional hydraulic component has a protruding stop (38) in the region of the first end face (26).

8. The hydraulic system (48, 50) according to claim 7, wherein the protruding stop (38) of each of the hydraulic component and the additional hydraulic component is supportable on a piston seat (40) in the closed position of the piston (4) of each of the hydraulic component and the additional hydraulic component.

9. The hydraulic system (48, 50) according to claim 8, wherein the piston seat (40) of each of the hydraulic component and the additional hydraulic component is a ring-shaped piston seat.

10. The hydraulic system (48, 50) according to claim 7, wherein the protruding stop (38) is designed as cone-shaped, a truncated cone, or cylindrical with the cylindrically designed protruding stop (38) of each of the hydraulic component and the additional hydraulic component having a cone-shaped or truncated cone end section (42), and the piston seat (40) of each of the hydraulic component and the additional hydraulic component is designed for flat support of the cone-shaped or truncated cone protruding stop (38) or end section (42).

11. The hydraulic system (48, 50) according to claim 1, wherein pressure can be applied to a first surface section (44) of the first end face (26) of each of the hydraulic component and the additional hydraulic component in the closed position of the piston (4) of each of the hydraulic component and the additional hydraulic component only via the first hydraulic line (30), and pressure can be applied to a second surface section (46) of the first end face (26) of each of the hydraulic component and the additional hydraulic component in the closed position of the piston (4) of each of the hydraulic component and the additional hydraulic component only via the second hydraulic line (32).

12. A hydraulic system according to claim 1, wherein the cylinders (6) of the at least one hydraulic component (2) and the additional hydraulic component (2) are intrinsic components of a cylinder block (20).

13. A clutch device comprising the hydraulic system (48; 50) according to claim 1 for cooling and hydraulic actuating and/or lubricating of the clutch device.

14. The hydraulic system (48, 50) as set forth in claim 1, wherein the additional hydraulic component (2) is designed as a coolant limiter (68) for limiting the coolant pressure of the coolant suppliable to the device.

* * * * *